United States Patent Office 2,712,242
Patented July 5, 1955

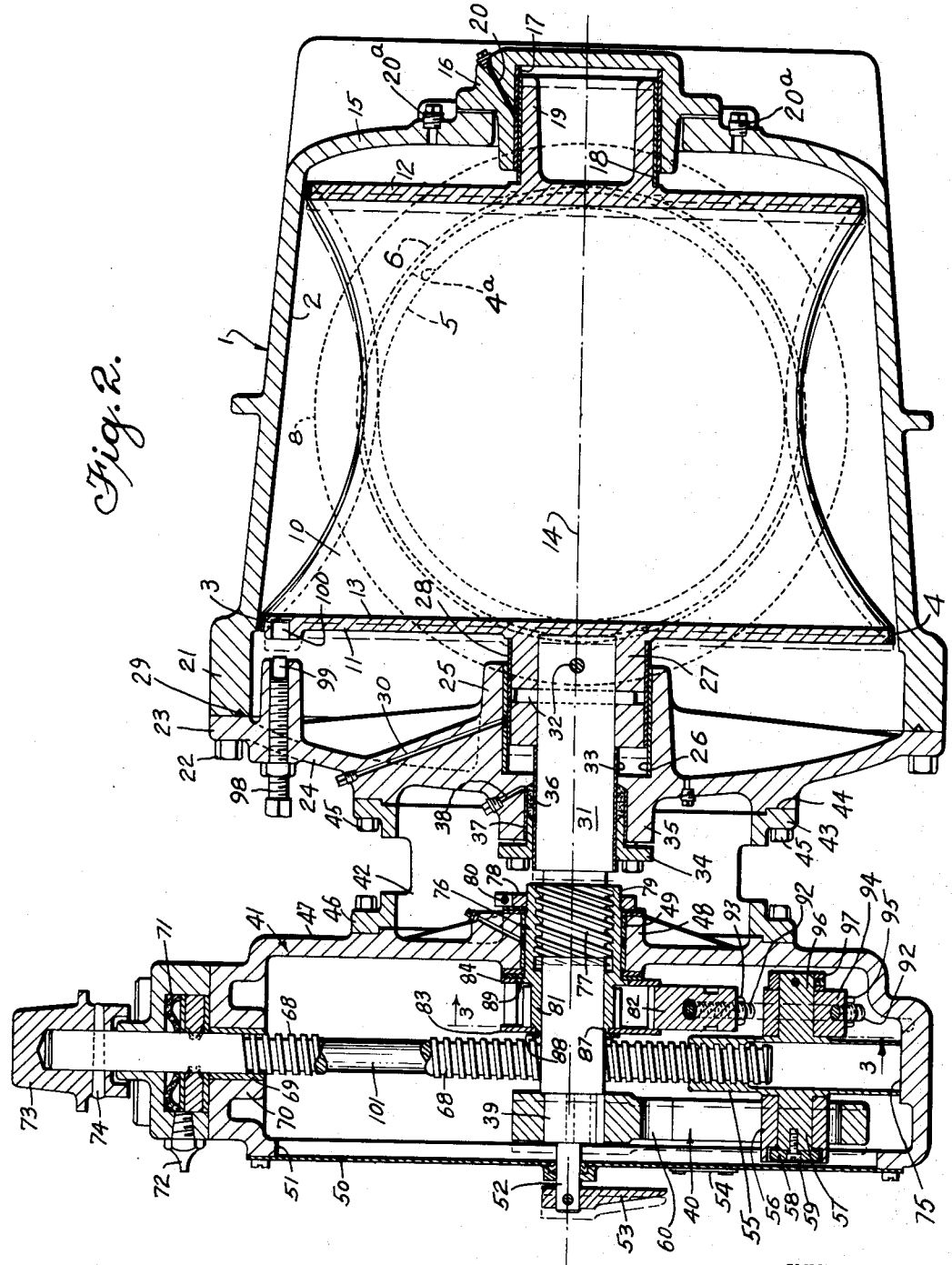

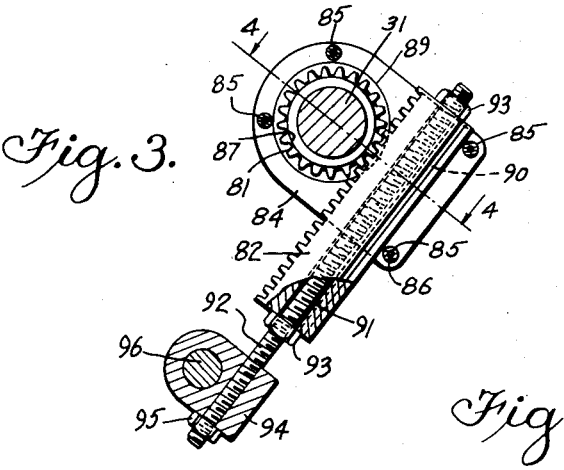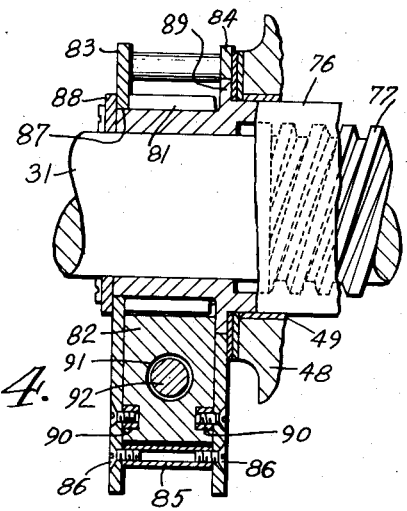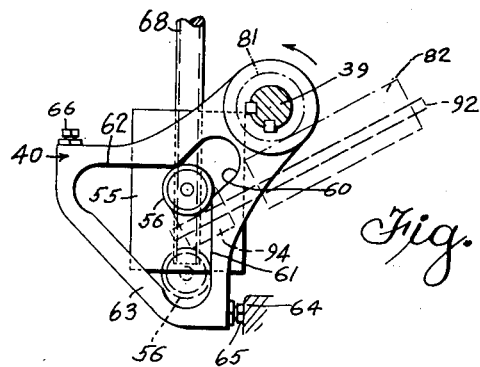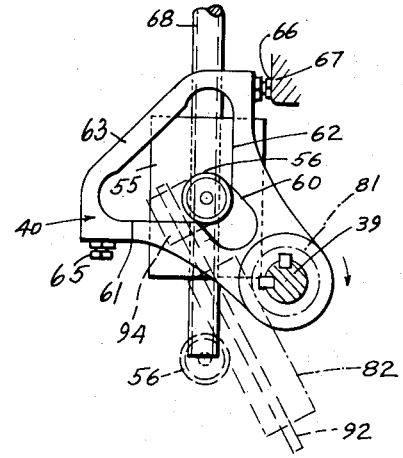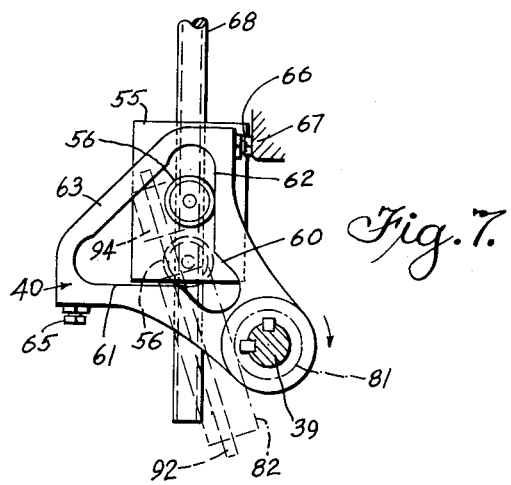

2,712,242
ROTARY PLUG VALVE AND APPARATUS FOR OPERATING SAME

David G. Davis, Beverly Hills, Calif., assignor to David G. Davis, Beverly Hills, Calif., as trustee Application April 15, 1950, Serial No. 156,103

8 Claims. (Cl. 74—22)

This invention relates to rotary plug valves.

The plug used with valves of this character is usually of conical form, and provided with one or more ports cooperating with ports formed in the valve body.

In order to operate the valve, the plug is rotated between open and closed positions. It is essential that the plug be seated in the body to seal the plug therein both in open and closed positions. It has been proposed, in valves of the prior art, to raise the plug off its seat prior to its rotation, and to reseat the plug upon conclusion of the angular movement of the plug. Such prior devices, however, have been cumbersome and expensive.

It is one of the objects of this invention to provide an improved and simplified plug operator of this general character.

In order to accomplish this result, the plug stem is operated to unseat prior to its rotation, and to reseat upon conclusion of its rotation, by the aid of a rack and pinion mechanism that actuates a screw, or the like, on the valve stem. It is, accordingly, another object of this invention to perform the unseating and reseating of the plug in this manner.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Fig. 2 is a sectional view, taken along a series of planes corresponding to lines 2—2 of Fig. 1;

Fig. 3 is a sectional view, taken along a plane corresponding to line 3—3 of Fig. 2;

Fig. 4 is a sectional view, taken along a plane corresponding to line 4—4 of Fig. 3; and Figs. 5, 6, and 7 are fragmentary diagrammatic views, similar to Fig. 1, illustrating different positions of the operating mechanism.

Figure 1:
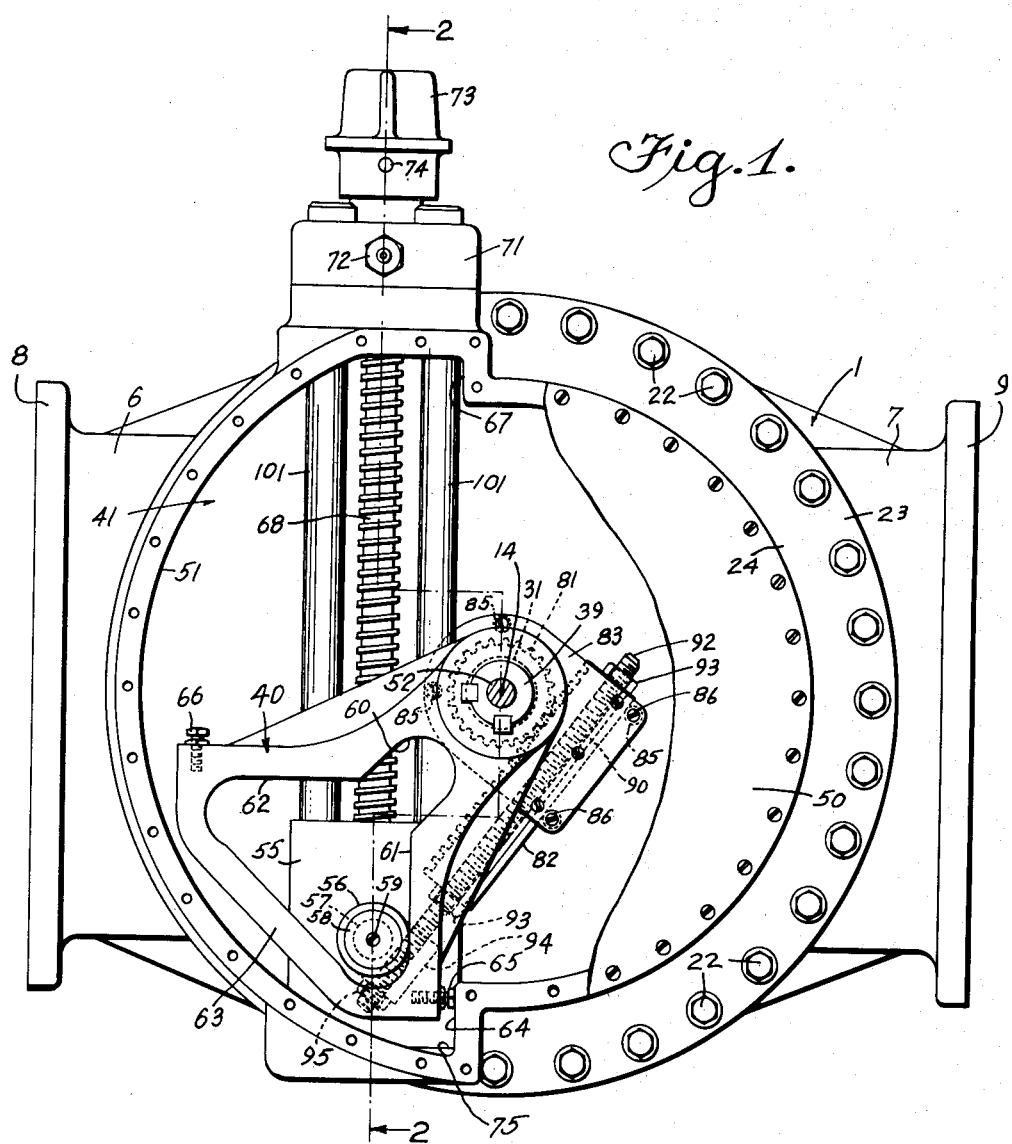
Figure 1 is an elevation of a valve operating mechanism embodying the invention, a part of the cover being broken away.

As shown most clearly in Fig. 2, the valve structure includes a body 1 made as a casting and having a conical interior surface 2. The valve is shown in closed position. The body 1 is also provided with oppositely directed ports 5 formed in the extensions 6 and 7 (Fig. 1) provided with coupling flanges 8 and 9. These ports 5 extend in a direction transverse to the axis 14 of the surface 2.

The opposite ends 11 and 12 of this plug are provided with seats 3 and 4, which are in the form of bands made commonly from non-corrosive metal, such as bronze or monel, and joined to the plug 10. A port 13 is formed diametrically through the plug 10. The seats 3 and 4 are respectively disposed around the ends of this port. In the position shown in Fig. 2, port 13 is out of alignment with the ports 5 of the body 1. Another set of seats 4a is carried by the plug 10 on diametrically opposite sides of the plug and at right angles to the plug port 13. These seats 4a are in tight sealing relation to bands, such as 3 and 4, around the edges of ports 5, and flow of fluid is interrupted by the body of the plug 10. A rotation of ninety degrees about the axis 14 of the plug serves to align the port 13 with the ports 5, so as to open the valve. In that position, seats 4 and 5 are disposed around these ports. The manner in which this rotation is accomplished will be described hereinafter.

The right-hand end of the body 1 has a wall 15 that serves to support a bearing structure 16. This bearing structure is lined with a bearing sleeve 17, cooperating with the bearing sleeve 18 mounted on the hollow stub shaft 19 that is integral with the plug 10.

Provisions for oiling are indicated by the oil channel 20. Furthermore, plugs 20a in the wall 15 may serve for the draining of any liquid that may pass the plug 10 into the body 1.

The left-hand end of the body 1 is provided with an enlarged flange 21. On this flange is attached, as by the aid of cap screws 22, a flange 23 of a cover member 24. This cover member may be formed as by casting, and is provided with an integral inwardly directed bearing standard 25 having a bearing sleeve 26. The left-hand end of the plug 10 is provided with an integral hollow shaft member 27, carrying a bearing sleeve 28 journalled in the sleeve 26. A gasket 29 may be interposed between the flanges 21 and 23. A lubricating duct 30 may be provided for the bearing surfaces between the sleeves 26 and 28.

The hollow extension 27 for the plug is joined to a stem 31, as by the aid of a pair of pins 32. This stem 31 is cylindrical, and is provided with a bearing sleeve 33 rotatable in a gland nut 34 fastened to the exterior side of the hub 35 on cover 24. Packing 36 is interposed between the sleeve 33 and a sleeve 37 in hub 35. A lubricating passage 38 is provided for this packing.

The stem 31, at its left-hand end, carries a reduced portion 39 to which is keyed an operating lever 40 (see, also, Figs. 1, 5, 6, and 7).

The mechanism for operating the lever 40 to rotate the plug 10 through ninety degrees is accommodated in a casing 41. This casing 41 is coupled to the cover 24, as by the aid of an intervening spacer or coupling member 42. Flange 43 of this spacer 42 engages a shoulder 44 of the cover 24, and is bolted thereto, as by the aid of the bolts 45.

The right-hand wall 47 of the casing 41 is similarly attached to another flange 46 carried by the coupling member 42.

A bearing boss 48, for further supporting the stem 31, is carried by the wall 47, and is lined with a bearing sleeve 49. Casing 41 is provided with a cover member 50 at its left-hand side to cover the opening 51. A reduced extension 52 of the stem projects through the cover 50 and carries a pointer 53 to indicate the position of the valve by the aid of a stationary index plate 54.

Operation of the lever 40 is accomplished by the aid of a linearly movable member, such as a nut 55, which has an axis at right angles to the axis 14. This member 55 carries an operating roller 56 (see, also, Figs. 4, 5, 6, and 7). This roller 56 is rotatably mounted on a stub shaft 57 integral with the member 55. It is held against axial removal by the aid of a collar 58 attached to the shaft 57 by the screw 59. The roller 56 has an overhanging flange covering the collar 58.

The lever 40 has a central groove or slot 60 with parallel side walls. Extending from the edges of the slot are two plane surfaces 61 and 62. These plane surfaces are at right angles to each other. With the connecting member 63, these surfaces 61 and 62 form, generally, a triangular space in which the roller 56 is located.

In the closed position of Fig. 1, the roller 56 is in contact with the surface 61. Now, as the nut 55 is moved upwardly, the roller 56 correspondingly moves upwardly, without rotating the lever 40, until the roller 56 engages the upper wall of the slot 60. This position is indicated in Fig. 5.

Accordingly, the roller proceeds, without rotating the plug 10, from the position indicated in Fig. 1 to the position indicated in Fig. 5.

Upon continued movement of the nut member 55, the slot 60 is engaged and the lever 40 is moved to the position corresponding to Fig. 6. This position indicates the roller 56 on the point of leaving the groove or slot 60, and on the point of contacting the surface 62. The upward movement of the roller 56 along surface 62, as indicated in Fig. 7, is no longer effective to rotate the lever 40. This upward movement may continue until the plug 10 is securely seated. This occurs when the roller 56 is at some intermediate point on surface 62.

Fig. 7 thus corresponds to the open position of the plug, the stem 31 having been rotated through an angle of ninety degrees by the aid of its extension 39 attached to the lever 40.

The operation of the lever 40 to close the valve from the position of Fig. 7 is similar to that described in connection with the opening movement. Upon lowering the member 55, the roller 56 moves downwardly and finally engages the groove or slot 60 to rotate the lever 40 to the position of Fig. 5. Continued movement of the roller 56 occurs along the surface 61 until it reaches its lowermost position, indicated in dot-and-dash lines in Fig. 5.

Positive stops may be provided to limit the movement of the lever 40 to the required ninety degrees and to maintain the plug 10 in a definite position at all times while the valve is open or closed. Thus, as shown most clearly in Fig. 1, the casing 41 is provided with a lower shoulder 64 against which an adjustable stop 65 abuts. This stop is carried by the lever 40.

A similar adjustable stop 66 is carried on the other side of the lever 40 to cooperate with the shoulder 67 formed on the upper side of the casing 41.

Nut 55 is caused to move linearly along the transverse axis by any suitable means, such as a lead screw 68. This lead screw is appropriately journalled in the sleeve 69 mounted in the hub 70 formed on the casing 41. An oil seal structure 71 of conventional design is mounted above the sleeve 69. An oil filling nipple 72 communicates with the oil seal.

The upper end of the lead screw 68 is attached to a non-circular operating member 73, as by the aid of a pin 74. Manual means, such as a wrench or handle, may be utilized to rotate the operating member 73, although, obviously, other mechanisms may be used. Downward movement of the member 55 is limited by a shoulder 75 (Fig. 2) formed on the bottom of casing 41.

During that part of the movement of the roller 56 on surface 61 and on surface 62, the plug 10 is moved axially with respect to its seat. In the opening movement indicated in Fig. 5, the plug 10 is lifted in order to unseat the plug before the roller 56 enters the slot 60. Similarly, after the roller 56 leaves the slot 60, as in Fig. 6, the roller contacts the surface 62 and the plug 10 is reseated.

For this purpose, a nut 76 (Figs. 2 and 4), restrained against axial movement, is in threaded engagement with a threaded portion 77 of the stem 31. The threads 77 are of quite steep pitch, so that a relatively small angular rotation of the nut 76 is sufficient to cause axial movement of the stem 31 for the purpose of unseating and reseating the plug 10.

The exterior surface of the nut 76 is cylindrical in order that it may be readily rotatable within the bearing sleeve 49. It is prevented from axial movement toward the left by a split collar 78 threaded on the threaded end 79 of nut 76 (Fig. 2). This collar 78 is locked against rotation by the aid of a screw 80 connecting the split parts of the collar.

At the left-hand end of the nut 76 there is integrally formed a pinion 81. Rotation of this pinion in one or the other direction thus causes rotation of nut 76, and the stem 31 is axially moved. This rotation is effected by the aid of a rack 82 meshing with the pinion 81. This rack is given a reciprocatory movement by movement of the operating member 55 in a manner to be hereinafter described.

The rack 82, as shown most clearly in Fig. 4, is made of rectangular stock. Plates 83 and 84 extend on each side of rack 82, and are held in spaced-apart relationship by the interiorly threaded bushings 85, into which engage the flat head screws 86. A cover plate 88 is attached to the left-hand side of the plate 83. The plate 84 has a bore in which flange 89 is engaged. This flange restricts axial movement of the nut. The plate 83 similarly engages the reduced shoulder 87 at the left-hand end of the pinion 81 (Fig. 4). By the aid of this construction, the frame formed by plates 83, 84 may have relative rotation on axis 14, so that the rack 82 is permitted, in the course of operation, to adjust its position angularly with respect to this axis.

The rack bar 82 is further guided, and kept in correct alignment with pinion 81, by the aid of the splines 90 extending into grooves on opposite sides of the bar 82. These bars are attached to the inner faces of the plates 83 and 84, as by small flat head screws.

The rack bar 82 has a longitudinal aperture 91 through which extends a threaded rod 92. Nuts 93 maintain the rack bar 82 in adjusted position with respect to the rod 92.

The lower end of the rod 92 is threaded into a block 94 (Figs. 1 and 3). A check nut 95 holds the rod 92 in position on the block 94.

The block 94 is pivotally mounted on a pin 96 that is shown in Fig. 2 as substantially coaxial with the stub shaft 57 and mounted on the right-hand side of the linearly movable member 55. A stop collar 97 maintains the block 94 against axial movement.

At the start of the opening movement from the position of Fig. 1, the rack is at its limiting end position. Now, as the member 55 moves upwardly along surface 61 to the position of Fig. 5, the plug 10 is raised with axial motion only. The rate of lifting gradually diminishes until a point just beyond the midway of the stroke where reseating begins, corresponding to minimum spacing between axis 14 and the axis of pin 96. The roller 56 later engages slot 60 for rotating plug 10 while it is reseating; and, when roller 56 cooperates with surface 62, the reseating operation is completed without rotation of the ring 10. This reseating is completed before roller 56 reaches the end of surface 62. The raised position of plug 10, at an intermediate position of roller 56 on surface 61, is indicated in dotted lines in Fig. 2.

The reciprocation of the rack with respect to the pinion 81 is automatically effected as the axis of pin 96 moves to and through a position where the distance between the axis 14 and the axis of pin 96 is a minimum. As heretofore stated, this occurs between the positions of Figs. 5 and 6. At that minimum point of separation, the movement of the rack 82 with respect to the pinion 81 is reversed.

By proper choice of the location of the axis of pin 96, this point of reciprocation can, to some extent, be altered without materially affecting the mode of operation. It is essential only that the plug 10 is substantially unseated during its rotation.

The rack 82 may be adjusted along the connecting rod 92 in order to cause the plug 10 to be properly seated at the extremities of the movement of the member 55.

The rack 82 is placed purposely below pinion 81, rather than above it. By this arrangement, unseating movement of the plug 10 is effected by a relatively large movement of roller 56 along surface 61; and a smaller movement is required of the roller 56 downwardly of surface 62 to unseat the plug from an open position. Thus, a greater mechanical advantage is secured when it is most needed; since, in closed position, there is a great hydraulic unbalance on the plug, and which is absent when the plug 10 is in open position. Thus, a greater lifting force is available to unseat the plug when this great hydraulic unbalance exists.

It may be desirable at times to ensure against rotation of the plug away from the closed position of Fig. 2. For this purpose, a screw 98 is threaded into the cover 24, and has a round end 99 adapted to engage a recess 100 in the left-hand side of the plug 10.

The member 55 is arranged to be guided in its linear movement by a pair of guide rods 101 extending through the member 55 and joined to the top and bottom portions of the casing 41.

The inventor claims:

1. In a lift-turn structure for a device having an axis of rotation: an arm mounted on the device for moving the device through an angle about said axis; an operator for the arm, movable in a direction transverse to the arm, said arm having three surfaces adapted to be contacted by the operator in succession, said three surfaces including a pair of end surfaces and an intermediate surface; the operator being effective to move the arm only when in contact with the intermediate surface; said device having threads coaxial with said axis; a threaded rotary member engaging the device threads and restrained against axial movement; a pinion attached to the threaded member; a rack engaging the pinion; a guide for the rack pivotally mounted on the said axis; a rack actuator connected to the operator; and a swingable connection between the actuator and the rack.

2. In a lift-turn structure for a device having an axis of rotation: means, including a linearly movable element, for turning said device through an angle about said axis; said element having a range of movement greater than that required for turning said device through said angle; a pinion mounted on said axis for moving the device along said axis; a rack engaging the pinion; and means connecting said movable element and the rack for moving the rack first in one direction with respect to the pinion, and then in the opposite direction, as the movement of the element approaches and recedes from the axis.

3. In a lift-turn structure for a device having an axis of rotation: means, including a linearly movable element, for turning said device through an angle about said axis; said element having a range of movement greater than that required for turning said device through said angle; a pinion mounted on said axis for moving the device along said axis; a rack engaging the pinion; the linear movement being transverse to the operative movement of the rack; and a connection between the rack and said linearly movable element for first moving the rack in one direction and then in the opposite direction, with respect to the pinion, as the connection moves through a minimum separation between its path of movement and the axis.

4. In a lift-turn structure for a device having an axis of rotation: an operating lever attached to the device; a movable element having a linear path of movement transverse to the axis and engaging the lever for moving the lever in either direction, depending upon the direction of movement of the element; said lever having a configuration such that the element is effective to move the lever only over an intermediate portion of the total travel of the element; a pinion mounted on said axis for moving the device along said axis; a rack engaging the pinion; and means connecting said movable element and the rack for moving the rack first in one direction and then in the opposite direction, with respect to the pinion, as the connection moves through a minimum separation beween its path of movement and the axis.

5. In a lift-turn structure for a device having an axis of rotation: means, including a linearly movable element, for turning said device through an angle about said axis; said element having a range of movement greater than that required for turning said device through said angle; a pinion mounted on said axis for moving the device along said axis; a rack engaging the pinion; the linear movement being transverse to the operative movement of the rack; an extension projecting longitudinally of the rack; and a connection pivotally carried by the element on an axis spaced from and parallel to the axis of the device, said connection being joined to the rack extension.

6. In a lift-turn structure for a device having an axis of rotation: an operating lever attached to the device; a movable element having a linear path of movement transverse to the axis and engaging the lever for moving the lever in either direction depending upon the direction of movement of the element; said lever having a configuration such that the element is effective to move the lever only over an intermediate portion of the total travel of the element; a pinion mounted on said axis for moving the device along said axis; a rack engaging the pinion; an extension projecting longitudinally of the rack; and a connection pivotally carried by the element on an axis spaced from and parallel to the axis of the device, said connection being joined to the rack extension for moving the rack first in one direction and then in the opposite direction, with respect to the pinion, as the pivot of the connection moves through a minimum separation between it and the axis of the device.

7. In a lift-turn structure for a device having an axis of rotation: an operating lever attached to the device; a movable element having a linear path of movement transverse to the axis and engaging the lever for moving the lever in either direction, depending upon the direction of movement of the element; said element having a surface contacting the lever, said surface having an axis transverse to the movement of the element; said lever having a configuration such that the element is effective to move the lever only over an intermediate portion of the total travel of the element; a pinion mounted on said axis for moving the device along said axis; a rack engaging the pinion; an extension projecting longitudinally of the rack; and a connection pivotally carried by the element on the axis of said surface, said projection being joined to the rack extension.

8. In a lift-turn structure for a device having an axis of rotation: means, including a linearly movable element, for turning said device through an angle about said axis; said element having a range of movement greater than that required for turning said device through said angle; a pinion mounted on said axis for moving the device along said axis; a rack engaging the pinion; the linear movement being transverse to the operative movement of the rack; an extension projecting longitudinally of the rack; a connection pivotally carried by the element on an axis spaced from and parallel to the axis of the device, said connection being joined to the rack extension; and means for adjusting the position of the rack with respect to the connection.

References Cited in the file of this patent

UNITED STATES PATENTS

| 1,958,262 | Boland | May 8, 1934 |
| 2,153,885 | Goldberg et al. | Apr. 11, 1939 |
| 2,326,686 | Rutledge | Aug. 10, 1943 |
| 2,329,788 | Rutledge | Sept. 21, 1943 |